3,120,441
NATURAL FLAVORED CARBONATED BEVERAGES

Jose C. Asturias, 11404 Haines NE., Albuquerque, N. Mex.
No Drawing. Filed June 12, 1961, Ser. No. 116,287
10 Claims. (Cl. 99—79)

This invention relates to natural flavored carbonated beverages and to the production of such beverages from juices or extracts of fruits, vegetables or other plant materials. It is particularly concerned with production of carbonated beverages from fruit and vegetable juices which have a flavor substantially identical to the natural juice from which the beverage is formed and which are substantially free of any alcohol.

The use of fermentation to produce carbonation in aqueous mixtures containing carbohydrates in order to produce effervescent beverages is, of course, well known. Since time immemorial, yeasts have been used to ferment carbohydrate containing plant juices or extracts to create effervescent drinks. Sparkling wines, beer and similar effervescent alcoholic beverages have heistorically been produced in this fashion.

Although the fermentation of natural juices or extracts to produce carbonated beverages is well known, the fermentation procedures available heretofore have resulted in a substantial alteration to the original flavor of the juice or extract before the fermentation operation and in most cases, also result in the production of substantial amounts of alcohol in the finished product. In the production of beer, sparkling wines or other fermented alcohol beverages, this has been desired. On the other hand, there is a large demand for carbonated beverages made from natural fruit or vegetable juices which contain no appreciable amount of alcohol. Procedures for the preparation of such carbonated beverages have been suggested and developed in the past. However, known procedures are generally characterized by the fact that very appreciable change in the flavor of the original starting material is brought about by the fermentation operations, so that the final product has a flavor which is quite different from the original fruit or vegetable juice. The change from the starting flavor caused by the fermentation often is the creation of a "yeasty" taste. Currently, because of cost as well as the problems discussed above, probably more carbonated beverages are made by artificial carbonation, i.e., by pressuring the aqueous fluid with an external source of carbon dioxide, then by natural fermentation.

A principal object of this invention is the provision of new processes for the production of carbonate beverages from the juices of plant matter without appreciably altering the natural flavor of the juice.

Further objects include:

(1) The provision of certain new, specific yeasts which are capable of producing new and desirable effervescent drinks which retain all of the flavor of the natural juice and which do not develop a yeasty taste in the carbonated beverage.

(2) The provision of processes for production of carbonated beverages by treatment of juices with yeast to produce naturally effervescent drinks which are substantially free of alcohol.

(3) The provision of a process for treating carbohydrate containing fruit or vegetable juices to convert a substantial portion of the complex sugars of the juices to monosaccharides.

(4) The provision of new, naturally effervescent, non-alcoholic juice drinks.

(5) The provision of a juice treating process which is capable of creating a desired level of natural effervescence in such a relatively short period of time that a minimum amount of alcohol and fermentation byproducts other than carbon dioxide are produced in the conversion of available sugars in the juice or extract to carbon dioxide.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by innoculating fruit juice, vegetable juice or other juice or extract of plant matter with certain species of Saccharomyces, then maintaining the innoculated mixture under specified conditions to permit the Saccharomyces strains to act upon the juice or extract, and finally heating the mixture to an elevated temperature, while maintaining it under sufficient pressure to prevent gas effervescence therefrom for a sufficient time to destroy the activity of Saccharomyces, and finally cooling the mixture to ambient temperature.

The particular yeast strains which are usable in carrying out the new processes of the invention and in obtaining the new, naturally effervescent drinks are the following:

(1) *Saccharomyces ovalis clapperi*
(2) *Saccharomyces ellipsoideus asturias*
(3) *Saccharomyces ellipsoideus chiffellei*

Strains of these species of Saccharomyces which are most effective in conducting the new processes have been deposited in the culture collection of the Northern Regional Research Laboratory, United States Department of Agriculture, Peoria, Illinois, where the following designations have been assigned:

NRRL Y–2582—*Saccharomyces ovalis clapperi*;
NRRL Y–2583—*Saccharomyces ellipsoideus asturias*;
NRRL Y–2584—*Saccharomyces ellipsoideus chiffellei*.

The species of Saccharomyces listed above may be classified as micro because they are extremely small in size. They appear to possess no cilia or flagella, although they seem to possess a method of propulsion which is probably due to the ingestion of carbohydrates which are converted within the organism to carbon dioxide and other byproducts which are retained for a period of time before being suddenly released through the ventral vacuole to cause the organism to move. The reproduction of the organisms has been observed by the usual budding and also by formation of ascospores. These yeast cells are difficult to stain and appear to disintegrate when exposed to heat drying or any of the common aqueous or alcohol soluble strains. Pure cultures of the yeast dried at slightly elevated temperatures, e.g., 37° C., will produce viable colonies of similar yeast which conform in every way to the original.

A further understanding of the new procedures and products of the invention can be had by reference to the following example, in which all parts and percentages are by weight unless otherwise specified.

Equal quantities of culture of the Saccharomyces Y–2582, Y–2583 and Y–2584 were added to water, each separately, and held in suspension at 35° C. until the suspension concentration reached $10^6$ yeast cells per cc. The control of the innoculum was made by comparison with pre-established concentrations measured on a spectrophotometer after colony count evaluation. After agitation had assured equal suspension of each yeast, separate, equal quantities of suspension were blended in a common container to obtain a yeast mixture inoculum.

Pineapple juice was obtained by crushing freshly cut pineapple and this was diluted by one-half its volume with water. Granulated sucrose was added in an amount of about one part of sucrose to ten parts of the diluted juice. The entire mixture was brought to a temperature of 36° C. and when the sucrose was completely dissolved, it was innoculated with one part of the yeast mixture innoculum for each 128 parts of the juice mixture.

The temperature of the innoculated mixture was maintained at 36° C. for two hours. During this time, the pH of the mixture rose slowly toward the alkaline side to above about 5.0 by the end of the two hour period. In other cases, if, at the end of the two hour period, there was no increase in pH as compared with an initial test on the juice mixture, the mixture was allowed to remain at atmospheric pressure at a temperature of 36° C. until an appreciable increase in pH was noted, at which time the juice mixture was placed in bottles and capped. The bottles were then placed in a water bath at a temperature of 37° C. for eight hours.

At the end of the eight hour period, the bottles were brought, over a one hour period, to a temperature of 65° C. in another water-filled vat. The temperature was held at 65° C. for twenty-five minutes, to destroy the activity of the innoculated yeast. The vat and the contained bottles of fruit juice were then cooled to ambient temperature, i.e., about 20° C. It was found upon uncapping bottles of the treated material that the resulting fruit juice beverage was quite highly carbonated and that the liquid effervesced vigorously when the juice drink was poured from the bottle into a glass tumbler or other drinking vessel. The resulting drink when tasted had a tangy quality imparted by the carbon dioxide but otherwise had a flavor which was not detectably different than the original pineapple juice. The resulting product, when subjected to suitable tests, was found ta contain less than one-half of one percent alcohol.

The treating operations as described above can apparently be applied to all juices or extracts of plant matter. The operations are particularly useful in the treatment of fruit and vegetable juices, including grape, apple, pineapple, apricot, peach, pear, plum, cantelope, watermelon, honeydew melon, tomato, coconut, banana, strawberry, raspberry, blackberry, loganberry and similar fruit or vegetable juices or extracts The term "juice" is used herein to include all such juices or extracts.

The natural juices can be treated just as they are formed from the natural fruit or vegetable, but it has been found that many people prefer a drink of increased sweetness and somewhat decreased flavor intensity, as compared with the natural fruit juice. Accordingly, the addition of raw or refined sucrose and water may be desirable. The amounts of these materials which are added to the natural juice can be varied in order to suit individual tastes or meet the demands of the purchasing public. Most acceptable carbonated beverages are those which contain 1–25 parts of sugar for each 100 parts of juice, and 1–10 parts of water for every 5 parts of juice.

In addition to sugar and water, other materials may be added to the natural juice in forming the carbonated beverages. This includes artificial flavors or colors, vitamins, mineral supplements, proteins or other materials of nutritional value. Normally, such added materials will constitute only a very small portion of the final drink, e.g., .01 to 3% by weight of the final product.

Treatment of the fruit juice can be accomplished using any of the three separate species of Saccharomyces, or in pairs. However, it has been found that the desired degree of carbonation is obtained in the shortest period of treatment following innoculation if a mixture of all three of the separate species of Saccharomyces are used for the innoculation and treatment of the juice compositions. Equal amounts of the separate yeasts in terms of yeast cells per volume of culture or suspension in such a mixture is preferred.

Following innoculation of a fruit juice composition with the innoculum, the mixture should be maintained at a temperature between about 35 and 40° C. until a sufficient amount of carbon dioxide has been produced by the action of the yeast on the carbohydrates of the composition ot provide the degree of carbonation desired for the final beverage, i.e., normally at least 2 p.s.i. and especially 2–10 p.s.i. The length of time has been found to vary somewhat with the particular juice or extract treated, but generally it is a period of about 2–20 hours, and especially 6–10 hours. The proper degree of treatment is generally characterized by an increase in pH to within the range of about 4–7, the exact value, of course, varying somewhat with the initial juice. Treatment within the range 35–40° C. can be carried out entirely in a closed vessel, with the solution under the pressure created by the action of the yeast in order to prevent evolution of the carbon dioxide, formed. However, it is found to be preferable to carry out the first stage of treatment in two steps, the first step being conducted at a temperature slightly lower than the second, and with the first step at atmospheric pressure, followed in the second with the increased pressure caused by the yeast action. This first step should proceed until the pH of the mixture has appreciably risen, e.g., about 1–2 hours. Following this, the mixture is maintained in a closed container generally for a period of about six to ten hours.

When the desired degree of carbonation has been obtained, the juice composition is heated to a temperature above 60° C., e.g., between about 60 and 70° C., while it is maintained under sufficient pressure to prevent gas evolution, for a sufficient time to destroy the activity of the innoculum. Normally, this is about 1 to 120 minutes, especially 20–30 minutes for the temperature range 60–70° C. Following this latter treatment at an elevated temperature, the resulting carbonated juice beverage should be slowly cooled, e.g., about no faster than 1 degree a minute, to ambient temperature.

The various steps in the new procedure can be carried out in any suitable equipment for conducting fermentation processes. A batch-type operation will generally be found most satisfactory, but it is also possible to carry out the new procedures in a continuous fashion. Of course, since the carbonated beverages will be primarily for human consumption, equipment which can be easily cleaned and sterilized should be used so that proper sanitary precautions may be observed.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A process for the production of carbonated beverages from the juices of plant matter without appreciably altering the natural flavor of the juice, which comprises innoculating juice of plant matter, containing carbohydrates with a yeast selected from the group consisting of *Saccharomyces ovalis clapperi, Saccharomyces ellipsoideus asturias* and *Saccharomyces ellipsoideus chiffelei,* maintaining the innoculated mixture at a temperature between about 35° and 40° C. until the pH of the mixture has increased within the range of about 4 to 7, then heating the mixture to between about 60° and 70° C., while maintaining it under pressure of between about 2–10 p.s.i. to prevent gas effervescence therefrom for between about 20–30 minutes to destroy the activity of said yeast and finally cooling the mixture to ambient temperature.

2. A process as claimed in claim 1 wherein said juice is a natural fruit juice.

3. A process as claimed in claim 1 wherein said juice is a natural vegetable juice.

4. A process as claimed in claim 1 wherein said innoculation is made with a mixture of equal amounts of said three Saccharomyces species.

5. A process as claimed in claim 1 wherein the innoculated mixture is maintained at about 35–40° C. under atmospheric pressure until an appreciable shift to a higher pH occurs and thereafter the mixture is maintained at a higher temperature within the range 35–40° C. under the pressure created by action of the yeast upon the mixture.

6. A process for the production of carbonated beverages from fruit and vegetable juices, said carbonated beverages having a flavor substantially identical to the natural juice from which they are formed and being substantially free of any alcohol which comprises innoculating a natural juice selected from the group consisting of fruit juices and vegetable juices with a mixture of the yeasts *Saccharomyces ovalis clapperi*, *Saccharomyces ellipsoideus asturias* and *Saccharomyces ellipsoideus chiffelei*, heating the mixture to a temperature between about 35° and 40° C., permitting the mixture to remain at atmospheric pressure until a detectable shift to a higher pH in the mixture occurs, then maintaining the mixture at between about 35° and 40° C. under the pressure generated by the carbon dioxide formed by the action of the yeast on the juice until the pressure increases to at least about 2 p.s.i., thereafter heating the mixture while it is maintained under pressure of between about 2–10 p.s.i. to prevent gas effervescence to between about 60° and 70° C. for between about 20–30 minutes to destroy the activity of said yeasts and finally cooling the mixture under said pressure to ambient temperature.

7. A process as claimed in claim 6 wherein said innoculation is made with a mixture of the yeasts NRRL–Y2582, NRRL–Y2583 and NRRL–Y2584.

8. A process as claimed in claim 6 wherein said heating at atmospheric pressure is for about 2–3 hours, said heating at 35–40° C. under pressure is for about 8–10 hours and said heating at 60–70° C. is for about 0.5–1 hour.

9. A process as claimed in claim 6 wherein said mixture is placed in bottles and capped following said heating at atmospheric pressure and remains bottled and capped throughout the remainder of said process.

10. A carbonated beverage prepared as defined in claim 1.

References Cited in the file of this patent

UNITED STATES PATENTS 2,156,499    Holcomb _____ May 2, 1939

FOREIGN PATENTS 152,121    Canada _____ Nov. 1913

OTHER REFERENCES

Prescott et al.: "Industrial Microbiology," McGraw-Hill Book Company, 1959, New York, pages 181–183. (Copy in Division 63.)